No. 690,472. Patented Jan. 7, 1902.
E. S. SMITH & H. GILES.
CASH REGISTER.
(Application filed Apr. 5, 1901.)
(No Model.) 4 Sheets—Sheet 4.

WITNESSES:
Gustave Dieterich.
John Kehlenbeck.

INVENTORS
Elmer S. Smith
Harvey Giles
BY
Chas. C. Gill
ATTORNEY

United States Patent Office.

ELMER S. SMITH, OF BOUNDBROOK, AND HARVEY GILES, OF SOUTH BOUNDBROOK, NEW JERSEY, ASSIGNORS TO IDEAL CASH REGISTER COMPANY, OF NEW BOUNDBROOK, NEW JERSEY, A CORPORATION OF NEW JERSEY.

CASH-REGISTER.

SPECIFICATION forming part of Letters Patent No. 690,472, dated January 7, 1902.

Application filed April 5, 1901. Serial No. 54,436. (No model.)

*To all whom it may concern:*

Be it known that we, ELMER S. SMITH, a resident of Boundbrook, and HARVEY GILES, a resident of South Boundbrook, Somerset county, New Jersey, citizens of the United States, have jointly invented certain new and useful Improvements in Cash-Registers, of which the following is a specification.

The invention relates to improvements in cash-registers; and it consists in the novel features, structure, and combinations of parts hereinafter described, and particularly pointed out in the claims.

The invention made the subject of the present application embodies certain improvements, hereinafter pointed out, upon the cash-register made the subject of Letters Patent No. 677,896, granted us July 9, 1901.

The cash-register shown in the drawings forming a part of this application in certain parts corresponds substantially with features of the register shown and described in said Letters Patent No. 677,896, and said parts are therefore only incidentally referred to hereinafter, having been shown in this application merely for the purpose of clearly illustrating the operation of the features made the special subject of the present application.

The cash-register illustrated in the accompanying drawings embodies a series of exposed actuating or setting levers to be moved along the columns of numerals on the front face of the register-casing for the purpose of setting certain interior segments into proper operative relation to the register mechanism and an exposed operating crank or handle, which is to be thereafter operated for placing the gears of the registering-wheels into direct engagement with the said segments and then effecting the movement of the said segments to their normal position, whereby said segments are caused to operate the registering mechanism to the extent desired and governed by the position given to said segments by the said actuating or setting levers.

The present invention pertains to four main features of the cash-register made the subject of the aforesaid Letters Patent No. 677,896; and the purpose of the present invention is to greatly simplify and render more efficient and durable the said cash-register.

The present invention comprises, first, novel mechanism operable from the exposed operating crank or handle for imparting to the registering-wheel shaft and the registering-wheels carried thereby a downward motion for the purpose of causing the gears on the registering-wheels to pass into mesh with the toothed segments, by which they are thereafter operated, and means for compelling the full downward motion of the said operating crank or handle to effect registration and a full upward motion of the said crank or handle when the latter is started back to its normal position; second, novel means for rigidly locking the exposed actuating or setting levers at all times except when the said operating crank or handle is in its normal at-rest position; third, novel means for locking in its closed position the cash-drawer of the register, and, fourth, shutter mechanism for the indicating cylinders or drums, said shutter mechanism being connected with and operated from the registering-wheel shaft.

The nature of the invention and satisfactory means for carrying the same into effect will be fully understood from the detailed description hereinafter presented, reference being had to the accompanying drawings, in which—

Figure 1 is a central vertical longitudinal section, partly broken away, through the casing and cash-drawer of the register and illustrates the interior mechanism of the register in end elevation. Fig. 2 is a detached perspective view of the shutter and the operating-rod by which said shutter is actuated from the registering-wheel shaft. Fig. 3 is a detached side elevation, and Fig. 4 a top edge view, of a cam-arm which in use is connected with the right-hand end of the sliding shaft which locks the actuating or setting levers during the time that the exposed crank or handle is away from its normal at-rest position, said cam-arm being operable from said exposed crank or handle. Fig. 7 is a like view on the dotted line 7 7 of Fig. 4. Fig. 10 is a side elevation, and Fig. 11 an edge view, of a ratchet-plate secured on the right-hand end of the main operating-shaft of the register. Fig. 12 is a horizontal section, partly broken away, through the right-hand portion of the interior mechanism of the register, said section being on the dotted line 12 12 of Fig. 7. Fig. 13 is an enlarged vertical section on the dotted line 13 13 of Fig. 5 and is intended to illustrate more particularly the means for locking the cash-drawer in its closed position. Fig. 14 is a side elevation, and Fig. 15 an edge view, of one of the parts of the drawer-locking mechanism.

In the drawings, 30 designates the exterior shell or casing of the register, 31 the cash-drawer, and 32 the spring, which is compressed during the closing of the cash-drawer and which when the cash-drawer is released from its locking devices drives said drawer to its open position.

Figure 5:
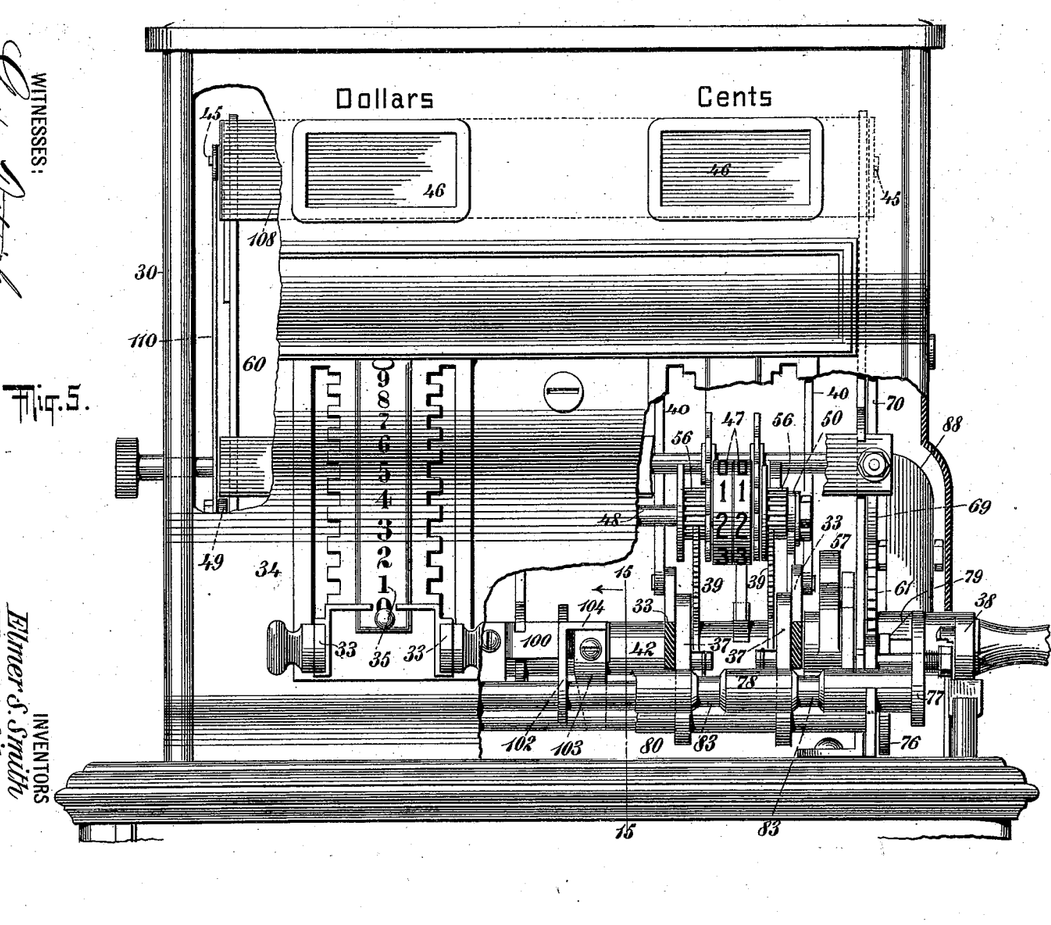
Fig. 5 is a front elevation, partly broken away and partly in section, of the cash-register embodying our invention.

The actuating or setting levers are designated by the numeral 33, and these levers extend forward through slots formed in the front plate 34 of the register, Fig. 5, as usual, which plate is furnished with the columns of numerals 35, ranging from "0" to "9," inclusive. The levers 33 are adapted to have a movement along the sides of the columns of numerals 35 and within the register-casing are provided with the rigidly-secured serrated segments 36, one segment being secured to each lever 33, which segments coact with the dogs 37, one dog 37 being provided for each segment 36 to create during the up-and-down movement of the levers 33 sufficient friction and resistance to enable the operator to properly control the said levers 33. The recesses formed by the serrations in the segments 36 are proportioned as to their separation with respect to the spaces between the numerals of the columns 35 on the front face 34 of the register-casing so that said recesses coöperating with the dogs 37 may aid in retaining the levers 33 in any of their various positions along the line of said numerals 35. The dogs 37 are spring-pressed against the serrated segments 36 and yieldingly resist the motion of the actuating-levers 33 and with said segments serve to retain said levers in any position along the line of numerals 35. At a certain time in the operation of the register the dogs 37, coöperating with the serrated segments 36, rigidly lock the setting-levers 33 against movement, and this feature of the construction and operation will be presently referred to. The initial position of the actuating-levers 33 is at the lower end of their slots in the front plate 34 of the register-casing, as denoted in Fig. 5, and when it is desired to register and indicate the amount of a sale the said levers (one or more, as may be necessary) will be moved upward to the proper position along the columns of numerals 35, said levers 33 being free to be moved at all times except when the operating crank-handle 38 is in operation or away from its normal at-rest position.

The actuating or setting levers 33 during their upward motion perform two main functions, as usual, the first being to set the segments 39, Fig. 5, and the second being through the vertical rack-bars 40 to actuate or "set" the indicating cylinders or drums 41. The segments 39, rack-bars 40, indicating cylinders or drums 41, and levers 33 are fully disclosed in said Letters Patent No. 677,896.

The segments 39 are loosely mounted upon the main driving-shaft 42 of the register and automatically follow the actuating-levers 33 during the upward movement of the latter, but in a well-known manner may be returned to their lower initial position under the operation of the crank-handle 38. The actuating-levers 33 turn freely upon the main driving-shaft 42, and likewise the segments 39 turn freely upon said shaft. The segments 39 during their return to their frontward and downward position effect through the means hereinafter described the registration, and during such return motion said segments 39 leave the actuating-levers 33 in their then upward position.

Figures 1, 2, 3, 4:
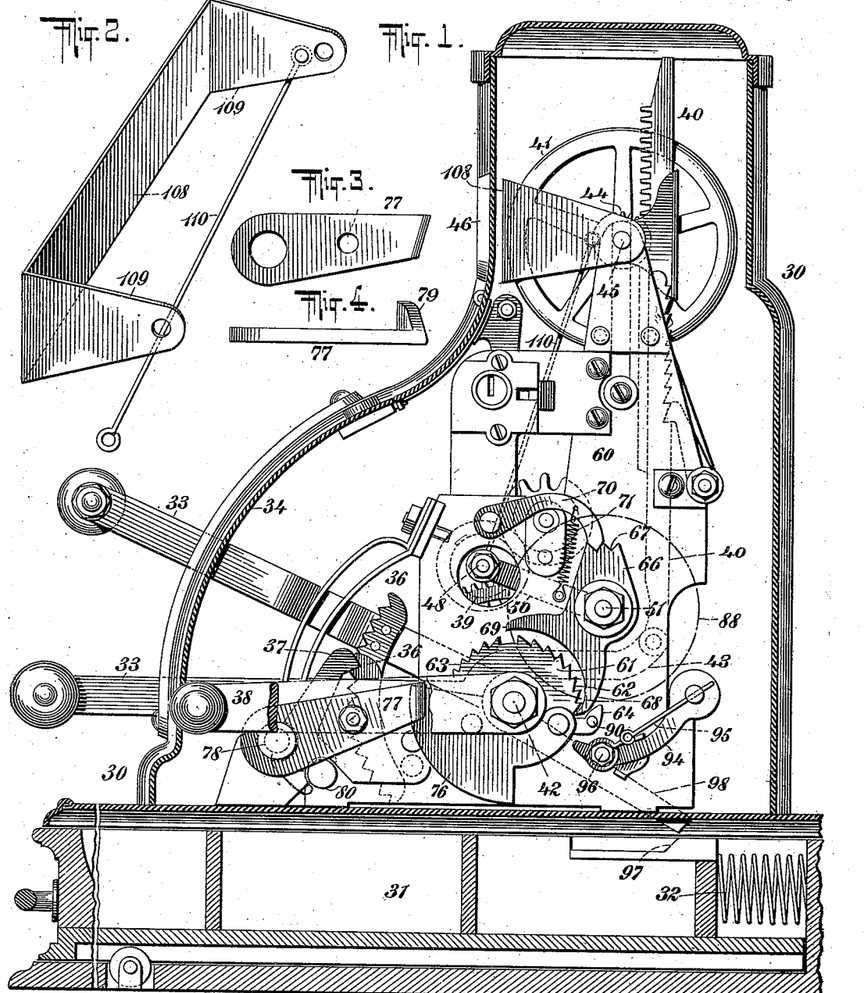
Figures 6, 8, 9:
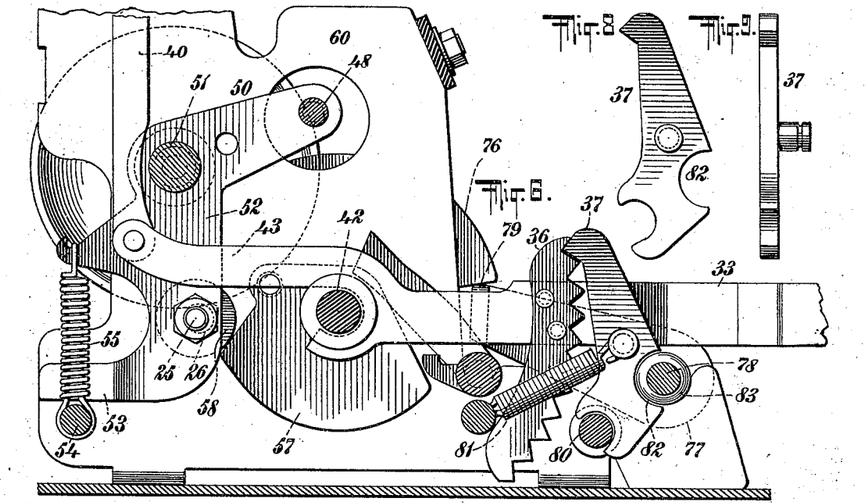
Fig. 6 is a vertical section, partly broken away, through a portion of the register on the dotted line 6 6 of Fig. 4.
Fig. 8 is a detached side elevation of one of the dogs for aiding in locking the actuating or setting levers.
Fig. 9 is an edge view of same.

The actuating-levers 33 are formed with the rearwardly-extending arms 43, Fig. 6, whose rear ends are pivotally secured to the lower ends of the rack-bars 40, (hereinbefore mentioned,) having along the front edge of their upper portion the teeth in mesh with usual pinion-wheels 44, Fig. 1, connected with the indicating cylinders or drums 41, loosely mounted upon their shaft, as more fully set forth in our aforesaid Letters Patent. The motion of each lever 33 thus effects the proper setting of its coöperating segment 39 and also the proper turning of the coöperating indicating cylinder or drum 41. In the construction shown the indicating cylinders or drums are adapted, as fully set forth in our aforesaid Letters Patent, to be elevated to a position in line with the window-openings 46, Fig. 5, formed in the register-casing; but said indicating cylinders or drums are primarily turned to the proper predetermined position when they are in their lower position below the direct line of the said window-openings 46. The special mechanism for effecting the vertical movement of the indicating cylinders or drums 41 is not necessary to be described herein, since said mechanism is made a special subject of the aforesaid Letters Patent; but it is to be understood that said indicating cylinders or drums are elevated at the proper time by the operation of the exposed crank-handle 38 when the latter is moved to effect registration, this crank-handle 38 remaining in its initial at-rest position until after the actuating-levers 33 have been moved to their proper position in accordance with the amount of the sale. The exposed operating crank-handle 38 is secured on the outer end of the main driving-shaft 42, and hence all of the operative parts of the register which are actuated from the crank-handle 38 receive their motion through the main driving-shaft 42.

The registering-wheels are numbered 47 and are mounted upon the shaft 48, which is parallel with and above the main driving-shaft 42. The registering-wheel shaft 48 is mounted in the front ends of the lever-arms 49 50, Figs. 1, 5, and 6, said lever-arms 49 50 being on the shaft 51 and corresponding exactly with one another, with the exception that the lever-arm 50, Fig. 6, is formed with the downwardly-extending portion 52, whose lower rearwardly-extending end 53 is directly over a shaft 54 and with said shaft forms a stop to limit the upward motion of the said lever-arms 49 50 with the registering-wheel shaft 48, carried by them. To the downward extension 52 of the lever-arm 50 is connected, Fig. 6, the coiled spring 55, which exerts a downward tension and normally retains the lever-arms 49 50 and registering-wheel shaft 48 in their upward position. The lever-arms 49 50 are rigid on the shaft 51, the latter being a rock-shaft, and hence it is sufficient that only the one lever-arm 50 be provided with the downwardly-extending section 52, connected with the spring 55 and coacting with the stationary shaft 54 to form a stop for limiting the movement upward of the said lever-arms 49 50 and registering-wheel shaft 48. The registering-wheel shaft 48 and registering-wheels 47 thereon are shown and described in our aforesaid Letters Patent; but in the present instance simplified mechanism is provided for imparting to the registering-wheel shaft 48 its up-and-down motion from the main driving-shaft 42 under the action of the exposed operating crank-handle 38. The downward movement of the registering-wheel shaft 48 with the lever-arms 49 50 is for the purpose of carrying the pinion-wheels 56, Fig. 5, connected with the registering-wheels 47, into engagement with the above-mentioned segments 39, so that said segments 39 while the registering-wheel shaft 48 is in its lower position may when operated from the crank-handle 38 rotate the registering-wheels 47, said segments 39 having no influence upon the pinion-wheels 56 and registering-wheels 47 when the registering-wheel shaft 48 is in its upper position.

The lowering of the registering-wheel shaft 48 so that the pinion-wheels 56, connected with the registering-wheels 47, may pass into mesh with the segments 39 is effected by the operator moving the exposed crank or handle 38 from its initial position frontward toward himself, whereby the main driving-shaft 42 is rotated and turns the cam 57, Fig. 6, secured on the driving-shaft 42, in a rearward direction against the roller 58, carried by the lower section 52 of the lever-arm 50, the rearward movement of the cam 57 acting on the roller 58 to drive the said lower section 52 rearward against the stress of the spring 55, whereby the rock-shaft 51 is caused to turn toward the front and move the lever-arms 49 50 with the registering-wheel shaft 48 downward to its lower position, bringing the pinion-wheels 56 into mesh with the segments 39. The registering-wheel shaft 48 will be maintained in its lower position during all of the time that the curved periphery of the cam 57 is riding against the roller 58, and hence the registering-wheel shaft 48 will remain in its lower position until the crank-handle 38 has been pulled to the full limit of its movement toward the front and then moved back to its initial position. When the lever 38 is in its initial position, the cam 57 will be in the position in which it is shown in Fig. 6, in which it will be observed that said cam 57 has then turned sufficiently toward the front to have passed from the roller 58 and allowed the spring 55 to restore the lever-arms 49 50 and registering-wheel shaft 48 to their normal initial upward position.

Figure 16:
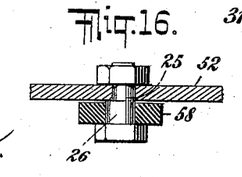
Fig. 16 is a detached section through a portion of one of the lever-arms.

The roller 58 is secured on the pin 25, which passes through an aperture in the downward extension 52 of the arm 50 and within said roller has an eccentric portion 26, Fig. 16, the purpose of the latter being by simply giving the pin 25 a partial turn to adjust the relation of the roller 58 to the cam 57 so that the latter may have just the desired action on the registering-wheel shaft 48.

Figures 7, 10, 11:
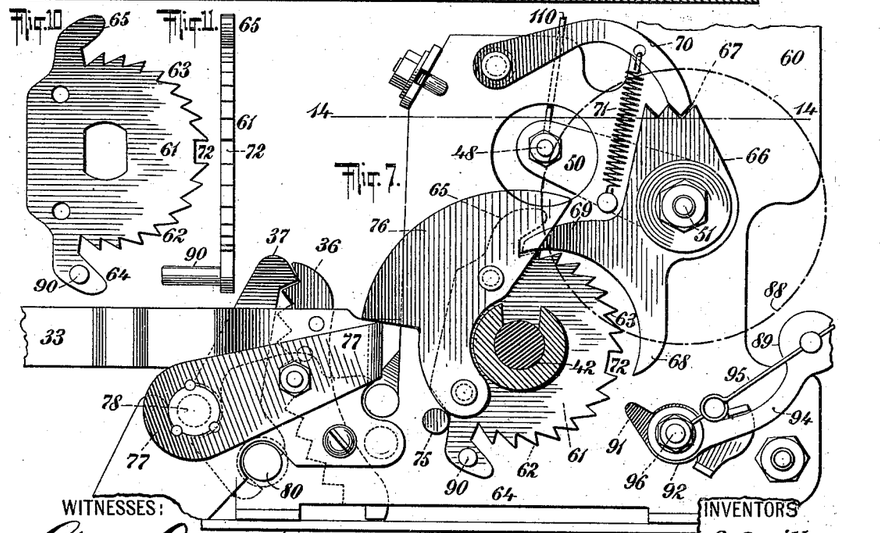

The mechanism provided at the right-hand portion of the main driving-shaft 42 compels the operating crank-handle 38 to have when once started a full frontward and downward motion and a full rearward and upward motion to its initial normal position, and this mechanism is more fully illustrated in Figs. 1 and 7, in which it may be seen that upon the driving-shaft 42 and close to the side of the supporting-frame 60 is secured the ratchet-plate 61, having the oppositely-arranged sets of teeth 62 63 and toes 64 65, and that upon the right-hand end of the rock-shaft 51 is loosely mounted the plate 66, having the serrations or teeth 67 at its upper end and at its lower portion being provided with the pawl-arms 68 69. The plate 66 is free to oscillate upon the end of the shaft 51, but is placed under a controlling tension by reason of the pivoted dog-arm 70 and spring 71, the spring 71 exerting a downward pull upon the dog-arm 70 and the outer end of said arm 70 having oppositely-beveled edges to engage the serrations or teeth 67 at the upper end of the plate 66. The initial position and relation of the plate 66 and ratchet-plate 61 are shown in Fig. 7, in which it will be seen that the pawl-arm 69 is in position to engage the ratchet-plate 61 and that the pawl-arm 68 is free from the ratchet 61.

When the operating crank-handle 38 is started frontward and downward, it will turn the driving-shaft 42, and with it the plate 61, and during the downward motion of the operating crank-handle 38 and the consequent frontward and downward turning motion of the plate 61 the pawl-arm 69 will engage and slip over the ratchet-teeth 63 until the end of said pawl-arm 69 reaches the recess 72 at the center of the periphery of the plate 61, at which time the operating crank-handle 38 will have substantially reached the full limit of its frontward and downward motion, although not entirely having arrived at that position, and the operator will be compelled, in order that he may return the crank-handle 38 to its former initial position, to give said handle a very slight further downward motion, to about the position shown in Fig. 1, in order that the toe 64 on the ratchet-plate 61 may ascend against the end of the pawl 68, and thereby turn the plate 66 to a sufficient extent to elevate the pawl-arm 69 from the ratchet-plate 61 and cause the right-hand serration 67 of the plate 66 to move from engagement with the end of the dog-arm 70 and the left-hand serration 67 of said plate 66 to pass below the end of said dog-arm 70, whereby the dog-arm 70 is caused to engage the left-hand serration 67, and thus continue its spring tension upon the plate 66, then in its new position, as shown in Fig. 1. During the upward and rearward motion of the operating crank-handle 38 the pawl-arm 68 will ride on the ratchet-teeth 62 of the plate 61 and prevent any return of the operating crank-handle 38 to its frontward and lower position until said crank-handle 38 has traveled to the full limit of its upward and rearward position, upon arriving at which the toe 65 of the ratchet-plate 61 will engage the pawl-arm 69 and turn the plate 66 upon the shaft 51 to a sufficient extent to move the pawl-arm 68 away from the ratchet-plate 61, as shown in Fig. 7. The plate 66 when acted upon by the toes 64 65 has a limited movement only sufficient to relieve one of the pawl-arms 68 from the ratchet-plate 61 and is at all times held under yielding restraint by the dog-arm 70 and spring 71. It will be observed that when the toes 64 65 engage their respective pawl-arms 68 69 they lap over upon the outer edges of said arms, and thereby effectually hold the plate 66 against having any but the predetermined extent of motion.

Upon the supporting-frame 60, Fig. 7, is provided a pin 75, which operates as a stop for the ratchet-plate 61 when the crank-handle 38 is in its upper normal initial position.

Figures 12, 13, 14, 15:
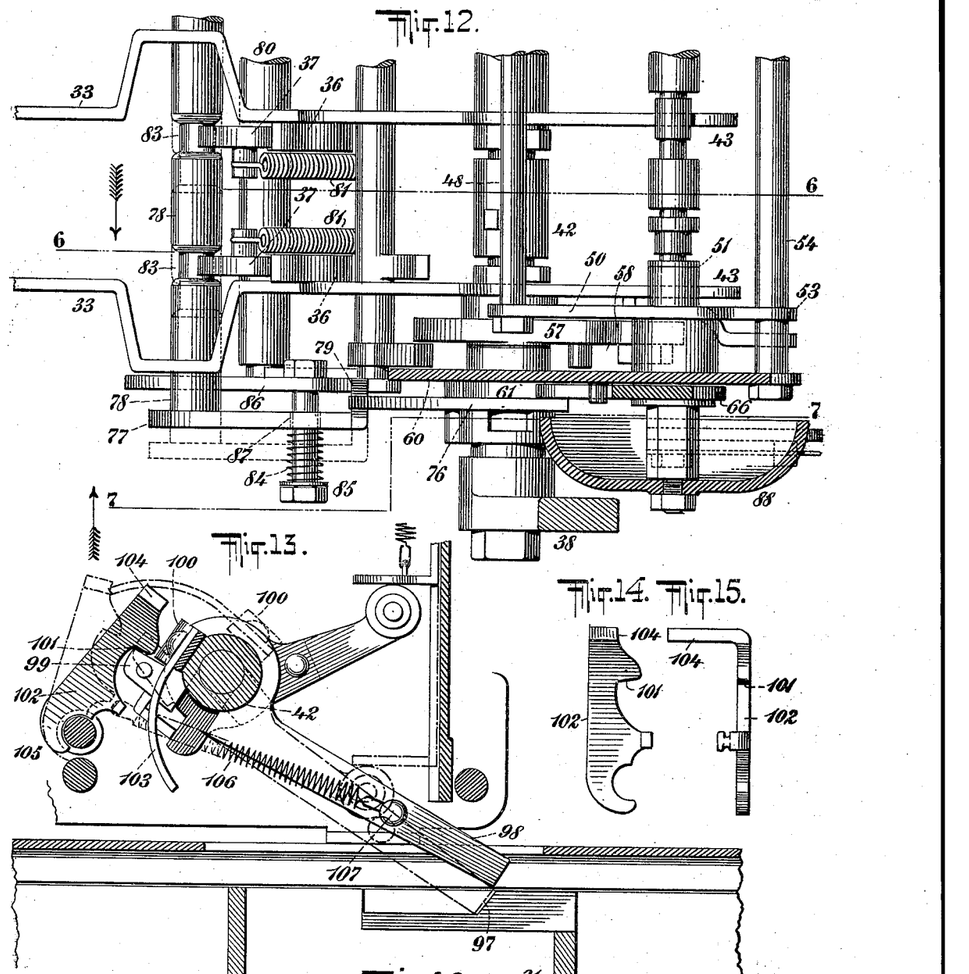

Upon the ratchet-plate 61 is rigidly secured or may be formed therewith, if desired, the plate 76, (see Fig. 7,) which has plain opposite side surfaces and is employed in connection with a cam-arm 77 to move the locking-shaft 78, connected with said cam-arm, outward laterally toward the right with every descent of the operating crank-handle 38 from its initial position to its frontward and downward position. The cam-arm 77 is shown in position in Figs. 1, 7, and 12 and in detail in Figs. 3 and 4, and said cam-arm 77 is rigidly secured at one end upon the end of the transverse locking-shaft 78 and at its rear end has upon its side the inclined or cam surface 79, which normally is disposed below the edge of the plate 76, carried by the ratchet-plate 61. When the operating crank-handle 38 is in its upper initial normal position, the plate 76 and cam-arm 77 will be in the relation to one another in which they are shown in Figs. 6, 7, and 12, and when the operating crank-handle 38 is pulled frontward and downward to effect registration the plate 76 is moved downward against the inclined or cam surface 79 of the cam-arm 77 and is thereby caused to force said cam-arm 77 and the shaft 78, connected therewith, outward laterally toward the right to the position indicated by dotted lines in Fig. 12 for the purpose hereinafter explained. During all of the downward motion of the operating crank-handle 38 from its initial normal position and during all of the return motion of said operating crank-handle 38 back to its initial normal position the outer surface of the plate 76 will ride against the laterally-turned rear end of the cam-arm 77 and maintain the cam-arm 77 and shaft 78 in the dotted position given to it by the contact of the plate 76 with the aforesaid inclined or cam surface 79. Thus during the downward motion of the crank-handle 38 and also during its return motion back to its initial position the cam-arm 77 and locking-shaft 78 are constantly maintained in their shifted position toward the right, which was imparted to them at the commencement of the downward movement of the plate 76 against the said cam-surface 79.

The purpose of shifting the locking-shaft 78 toward the right when the operating crank-handle 38 is first started on its frontward and downward motion to effect registration and of maintaining said shaft 78 in its shifted position until the said operating crank-handle 38 has been returned to its normal at-rest position is for the purpose of effecting the rigid locking of the actuating or setting levers 33 during all the time that the operating crank-handle 38 is away from its initial normal at-rest position.

The locking-shaft 78 in effecting the locking of the actuating or setting levers 33 coöperates with the dogs 37 and serrated segmental racks 36, hereinbefore referred to, and which are clearly illustrated in Figs. 5, 6, 8, and 9. The locking-dogs 37 are mounted upon the rod 80, as shown in Fig. 6, and are given a spring tension toward the serrated segments 36 by means of the coiled springs 81, so that said dogs 37 normally yieldingly press against the said serrated segments 36. At their rear sides the dogs 37 are provided with the substantially semicircular recesses 82, which pass upon the rear side of the locking-shaft 78, as illustrated in Fig. 6, but have no rigid connection with said shaft 78. The shaft 78 is formed with annular grooves 83, which when the shaft 78 is at its initial position—that is, when the operating crank-handle 38 is in its upper normal at-rest position—are in line with the semicircular grooves 82 in the dogs 37, and the said grooves 83, when the shaft 78 is in the position stated, allows sufficient freedom of movement in the dogs 37 to permit them to have a vibratory movement when the serrated segments 36 of the levers 33 are moved over them during either the downward or upward movement of said levers 33. When the grooves 83 in the locking-shaft 78 are in line with the semicircular grooves 82 of the dogs 37, as shown by full lines in Fig. 12, the actuating or setting levers 33 may be freely moved upward or downward, as may be desired, and during such movement the dogs 37 and springs 81, coöperating with the serrated segments 36, aid in the control of the said levers 33 and maintain the levers 33 in any of the various positions to which they may be moved. It is desired, however, that after the levers 33 have been moved to their proper predetermined positions they shall be locked stationary while the exposed operating crank-handle 38 is performing its duty and is away from its initial normal at-rest position, and hence the plate 76, cam-arm 77, and locking-shaft 78 are provided, so that when the operating crank-handle 38 is in motion or away from its normal position the plate 76, set in motion by said operating crank-handle 38, will maintain the locking-shaft 78 in its aforesaid shifted position toward the right, in which position (indicated by the dotted lines in Fig. 12) the said shaft 78, instead of presenting its annular grooves 83 to the dogs 37, has said grooves removed from alinement with said dogs, Fig. 5, and in its full diameter is within the semicircular recesses 82 in the dogs 37, whereby said dogs 37 are locked against having any movement whatever, said dogs being unable to move rearward or frontward by reason of their three points of contact, one being with the rod 80, another being with the locking-shaft 78, and the third being with the serrated segments 36. The locking-shaft 78 when at its inward position (shown in full lines in Fig. 12) performs no function whatever, and at such time the actuating or setting levers 33 may be moved freely upward or downward, as may be desired. The locking-shaft 78 when in its outward or shifted position toward the right, due to the action of the plate 76 on the cam-arm 77, performs the one essential duty of locking the actuating-levers 33 in rigid position, so that after said levers 33 have been set the operator cannot readjust them while the operating crank-handle 38 is absent from its normal at-rest initial position. The shaft 78 is in one continuous piece of metal and is provided with a groove 83 for each of the dogs 37, and hence when the shaft 78 is at its inner initial position all or any of the dogs 37 may have their vibratory motion at will, and when said shaft 78 is at its outer or locking position it will lock all of the dogs 37 against movement. As above described, the shaft 78 is given its outward or locking position by the contact of the plate 76 with the inclined surface 79 of the cam-arm 77, and upon reference to Fig. 12 it will be seen that the shaft 78 is returned to its initial inner position by means of a coiled spring 84, disposed upon a rod 85, which is secured at its inner end to a stationary plate 86 and passes freely through an aperture 87 in the aforesaid cam-arm 77. The rod 85 while holding the spring 84 also aids in supporting and guiding the rear end of the cam-arm 77.

Incidental to the downward motion of the operating crank-handle 38 from its normal at-rest position the gong or alarm 88 is sounded by the bell-hammer 89, which is tripped at such time by means of a pin 90, secured upon the toe 64 of the ratchet-plate 61, the said pin when the crank-handle 38 is arriving at its lower position being caused to move against and pass the arm 91 of the pivoted plate 92.

The next part of the invention to be described relates to the means for locking the cash-drawer, and the special feature of novelty pertaining to this part of the invention consists in the novel mechanism by which the drawer-locking latch-bar is prevented from locking the cash-drawer in its closed position until the exposed operating crank-handle 38 is returned to its upper position to expose the indication. The cash-drawer 31 has a shoulder 97 for coöperation with the latch-rod 98, of the character shown in said Patent No. 677,896, and having the toe 99 to be engaged by the stirrup 100 on the shaft 42, and also at the proper time to be engaged by the shoulder 101 of the lever-arm 102. A cam-plate 103 on the shaft 42 is utilized to move against the laterally-projecting arm 104 of the lever-arm 102 and free the shoulder 101 of said lever-arm from the toe 99 of the latch-rod 98. The lever-arm 102 is swiveled on the shaft 105 and is under a normal tension, drawing it toward the shaft 42 by means of the coiled spring 106, which is connected at one end to the said lever-arm 102 and at the other end to a pin 107, fastened to the latch-rod 98. The spring 106 performs two functions, one being to exert a force against the latch-rod 98 in a direction drawing the same downward to its locking position and the other being to yieldingly draw the lever-arm 102 in a direction toward the driving-shaft 42. The operation of this part of the invention may be briefly stated as follows: When the lever-arm 38 is pulled frontward and downward to effect registration, the stirrup 100 on the driving-shaft 42 is moved toward and finally against the toe 99 of the latch-rod 98 to elevate the rear end of the latter from the cash-drawer, so that said drawer may be opened by the spring 32, and at the same time the cam-plate 103 turns downward from the arm 104 of the lever 102, and the spring 106 draws the latter inward to the position in which it is shown by full lines in Fig. 13, so that it may engage the toe 99 of the said latch-rod 98. When the lever-arm is moved upward and rearward to its normal at-rest position, the stirrup 100 leaves the toe 99 of the latch-rod 98 and for a time the lever-arm 102, engaging said toe 99, will retain the latch-rod 98 in its elevated position. During the upward movement of the lever-arm 38 to its normal initial position the cam-plate 103 is turned upward, and, finally, just about when the lever-arm 38 is arriving at its upper initial position the said cam-plate 103 moves against the lateral arm 104 of the lever 102 and moves the upper portion of said lever frontward, whereby the shoulder 101 thereof is caused to leave the toe 99 of the latch-rod 98 and the latter is left free to descend to its lower position under the influence of the spring 106, so that it may automatically lock the cash-drawer 31 when the latter is pushed inward in the usual manner. The new features of construction pertaining to the locking mechanism thus consist of the pivoted lever-arm 99, cam-plate 103, and spring 106, and the object of these features is, as above explained, to prevent the locking of the cash-drawer in its closed position until the operating lever-arm 38 has just about reached its upper normal initial position.

The next feature of the invention to be described pertains to the shutter mechanism, and this feature is illustrated in Figs. 1, 2, and 5. The shutter is numbered 108 and is a plain strip of metal whose bent ends 109 are apertured and hung upon studs 45 at the opposite ends of the interior supporting-frame 60 of the register mechanism, so that the said shutter 108 may have a pivotal movement upon the said studs 45. It has been hereinbefore described that the registering-wheel shaft 48 is vertically movable and is in its lower position while registration is taking place. The frontward and downward movement of the exposed operating crank-handle 38 effects registration and the setting of the indicating cylinders or drums 41, and while this operation of the exposed crank-handle 38 is taking place it is desirable that the shutter 108 shall close the window-openings 46, and to this end we connect one arm 109 of the shutter 108 with the registering-wheel shaft 48 by means of a rod 110, so that upon the descent of the operating crank-handle 38 to the position shown in Figs. 1 and 5 and the consequent lowering of the registering-wheel shaft 48 the shutter 108 will be turned downward to a position, as shown in Figs. 1 and 5, in line with the window-openings 46 for the purpose of concealing the indicating cylinders or drums 41. When the operating crank-handle 38 is returned to its upper normal position, the registering-wheel shaft 48 moves upward to its normal inoperative position, and during this movement of the registering-wheel shaft 48 it, pressing against the connecting-rod 110, causes the shutter 108 to turn upward on the studs 45, the result being that when the exposed operating crank-handle 38 has reached its upper initial position the shutter 108 will have turned upward from the window-openings 46, and the indication on the cylinders or drums 41 will be exposed at said window-openings. The shutter 108 will remain in its upper position, exposing the indicating cylinders or drums 41 until another sale has been effected and the operating crank-handle 38 has again been pulled downward from its normal initial position to effect the registration of the subsequent sale.

The operation of the several features comprising the present invention has been so fully explained hereinbefore that it is deemed a further description of the operation is not necessary.

What we claim as our invention, and desire to secure by Letters Patent, is—

1. In a cash-register, the actuating or setting hand-levers, the segments 39 to be set by said hand-levers, the driving-shaft from which said segments are to be operated to effect registration, the operating crank-handle connected with said driving-shaft for operating the same, and the movable shaft 48 carrying the registering-wheels and their gear, combined with the rock-shaft 51, the lever-arms 49, 50 on said rock-shaft and supporting at their front ends the registering-wheel shaft, the downwardly-extending plate or section 52 integral with the lever-arm 50 and having the horizontally-disposed arm 53, the rod 54 coöperating with said arm 53 to form a stop, the spring 55 exerting a downward pull on said plate or section 52 and tending normally to move the registering-wheel shaft to its upper position, and the cam 57 on the said driving-shaft and adapted to engage the said plate or section 52 for moving the registering-wheel shaft to its lower position and there maintaining it while said segments are rotating the registering-wheels, substantially as set forth.

2. In a cash-register, the actuating or setting hand-levers, the segments 39 to be set by hand-levers, the driving-shaft from which said segments are to be operated to effect registration, the operating crank-handle connected with said driving-shaft for operating the same, and the movable shaft 48 carrying the registering-wheels and their gear, combined with the rock-shaft 51, the lever-arms 49, 50 on said rock-shaft and supporting at their front ends the registering-wheel shaft, the downwardly-extending plate or section 52 on said rock-shaft and having the arm 53, the rod 54 coöperating with said rod 53 to form a stop, the spring 55 exerting a downward pull on said plate or section 52 and tending normally to move the registering-wheel shaft to its upper position, the eccentric-pin 25 carried by said plate or section 52, the roller 58 on said eccentric-pin 25, and the cam 57 on the said driving-shaft and adapted to engage the said roller on the said plate or section 52 for moving the registering-wheel shaft to its lower position and there maintaining it while said segments are rotating the registering-wheels, substantially as set forth.

3. In a cash-register, the actuating or setting hand-levers, the segments 39 to be set by said hand-levers, the driving-shaft from which said segments are to be operated to effect registration, the operating crank-handle connected with said driving-shaft for operating the same, and the movable shaft 48 carrying the registering-wheels and their gear, combined with the rock-shaft 51, the lever-arms 49, 50 on said rock-shaft and supporting at their front ends the registering-wheel shaft, the downwardly-extending plate or section 52 integral with said lever-arm 50 and having the horizontally-disposed arm 53, the spring 55 connected at its upper end to said plate 52 and whose tension is exerted to maintain said registering-wheel shaft in its upper position, a stop for limiting the downward motion of said plate or section 52, and to which stop the lower end of said spring 55 is secured, the roller 58 carried by said plate or section 52, and the cam 57 on said driving-shaft and adapted to engage the said roller on said plate or section 52 for moving the registering-wheel shaft to its lower position and there maintaining it while said segments are rotating the registering-wheels, substantially as set forth.

4. In a cash-register, the actuating hand-levers, the segments 39 to be set by said levers, the main driving-shaft from which said segments are to be operated, the registering-wheels, and the gear-wheels connected therewith, combined with the operating-handle for the said shaft, mechanism intermediate said shaft and said registering-wheels for bringing said gear-wheels of said registering-wheels into engagement with said segments after the latter have been set preparatory to the rotation of said registering-wheels from said handle, the segmental plate 61 rigid on said driving-shaft and having teeth along a circular portion of its periphery and also having, at the ends of said circular part of said periphery the toes 64, 65, the plate 66 pivotally mounted at a fixed point and having the integral pawl-arms 68, 69, spanning one-half of the toothed portion of said plate 61 and at their outer surfaces adapted to coöperate with the inner surfaces of said toes 64, 65, and the spring-pressed dog 70 to engage said plate 66 and permit of the change in position of same under the action of said toes 64, 65, the said spring-pressed dog 70 and said plate 66 being respectively provided with the oppositely-beveled end and the teeth 67, substantially as shown and described.

5. In a cash-register, the actuating hand-levers, the segments 39 to be set by said levers, the main driving-shaft from which said segments are to be operated, the registering-wheels, and the gear-wheels connected therewith, combined with the operating crank or handle connected with said driving-shaft for operating said segments and said registering-wheels, the serrated segments 36 secured to said actuating hand-levers, the pivotally-mounted dogs 37 adapted to engage said segments 36, the springs for pressing said dogs against said segments, the laterally-sliding locking-shaft 78 normally free of said dogs 37, the cam-arm 77 on the end of said locking-shaft 78, and the plate 76 connected with the main driving-shaft for engaging said cam-arm 77 and shifting said locking-shaft 78 laterally when the operating crank-handle is moved to effect registration, whereby said locking-shaft 78 is moved to lock said dogs 37 against movement and the actuating hand-levers are locked from the operating crank-handle and prevented from being moved until the plate 76 has been removed from contact with the said cam-arm 77, substantially as set forth.

6. In a cash-register, the actuating hand-levers, the segments 39 to be set by said levers, the main driving-shaft from which said segments are to be operated, the registering-wheels, and the gear-wheels connected therewith, combined with the operating crank or handle connected with said driving-shaft for operating said segments and said registering-wheels, the serrated segments 36 secured to said actuating hand-levers, the pivotally-mounted dogs 37 adapted to engage said segments 36, the springs for pressing said dogs against said segments 36, the sliding locking-shaft 78 having grooves 83 normally in line with said dogs, the cam-arm 77 on the end of said sliding shaft 78, and the plate 76 connected with the main driving-shaft for engaging said cam-arm 77 when the operating crank-handle is away from its normal initial position, said plate 76, when the crank-handle is away from its normal position, being adapted to maintain the locking-shaft 78 in its shifted position, in which position the said grooves 83 are removed from alinement with said dogs 37 and said shaft is caused to effect the locking of said dogs against movement, substantially as set forth.

7. In a cash-register, the actuating or setting hand-levers 33, the serrated segments 36 thereon, the main driving-shaft for setting in motion the operating parts of the register, and the operating crank-handle 38 connected with said driving-shaft, combined with the pivotally-mounted dogs 37 adapted to engage said serrated segments 36, the springs 81 connected with said dogs and yieldingly pressing the same against said segments, the slidable locking-shaft 78 provided with grooves 83 and having a portion of its surfaces within the recesses 82 formed in said dogs 37, and means connected with the said driving-shaft for sliding said locking-shaft 78 so that its grooves 83 will leave the said recesses 82 and said shaft will lock said dogs 37 against said segments 36 when said crank-handle moves from its normal position, whereby the actuating-levers 33 are locked against movement while the operating crank-handle is away from its normal initial position, substantially as set forth.

8. In a cash-register, the actuating or setting hand-levers 33, the serrated segments 36 thereon, the main driving-shaft for setting in motion the operating parts of the register, and the operating crank-handle 38 connected with said driving-shaft, combined with the pivotally-mounted dogs 37 adapted to engage said serrated segments 36, the springs 81 connected with said dogs and yieldingly pressing the same against said segments, the slidable locking-shaft 78 provided with grooves 83 and having a portion of its surfaces within recesses 82 formed in said dogs 37, mechanism operable from the main driving-shaft for shifting said locking-shaft 78 laterally to withdraw its grooves 83 from alinement with the dogs 37 and causing said shaft to lock said dogs against movement when the said operating crank-handle 38 is moved from its normal initial position, and a spring for restoring said shaft 78 to its normal inoperative position with its grooves 83 in line with said recesses 82 when the said operating crank-handle 38 is restored to its normal initial position, substantially as set forth.

9. In a cash-register, the main operating-shaft 42, the crank-handle 38 for the manual operation of said shaft, the movable registering-wheel shaft 48, and means intermediate said driving-shaft and said registering-wheel shaft for lowering the latter preparatory to the registration being effected by the operation of said crank-handle, combined with the indicating cylinders or drums, the pivotally-mounted shutter 108 for said cylinders or drums, and the rod 110 connecting said shutter with said registering-wheel shaft, so that upon the lowering of said registering-wheel shaft said shutter may be pulled down to conceal the indicating-cylinders and upon the elevating of said registering-wheel shaft said rod may push said shutter upward to expose the indication; substantially as set forth.

10. In a cash-register, the cash-drawer 31 having the shoulder 97, the main operating-shaft 42, and the crank-handle 38 for the manual operation of the said shaft, combined with the drawer-latch 98 mounted upon said shaft and adapted, when in its lower position, to engage said shoulder 97 and lock the cash-drawer in closed position, the stirrup 100 on said driving-shaft for engaging said latch 98 to elevate the same and release said drawer when the crank-handle is moved to effect registration, the locking-arm 102 for engaging said latch 98 and holding the same free of the cash-drawer during a portion of the movement of said crank-handle, and means connected with said driving-shaft for releasing said arm 102 from said latch 97 upon the arriving of said crank-handle at its normal initial position; substantially as set forth.

11. In a cash-register, the cash-drawer 31 having the shoulder 97, the main operating-shaft 42, and the crank-handle 38 for the manual operation of the said shaft, combined with the drawer-latch 98 mounted upon said shaft and adapted, when in its lower position, to engage said shoulder 97 and lock the cash-drawer in closed position, the stirrup 100 on said driving-shaft for engaging said latch 98 to elevate the same and release said drawer when the crank-handle is moved to effect registration, the locking-arm 102 for engaging said latch 98 and holding the same free of the cash-drawer during a portion of the movement of said crank-handle, and the arm 103 connected with said driving-shaft for releasing said arm 102 from said latch 97 upon the arriving of said crank-handle at its normal initial position; substantially as set forth.

12. In a cash-register, the cash-drawer 31 having the shoulder 97, the main operating-shaft 42, and the crank-handle 38 for the manual operation of the said shaft, combined with the drawer-latch 98 mounted upon said shaft and adapted, when in its lower position, to engage said shoulder 97 and lock the cash-drawer in closed position, the stirrup 100 on said driving-shaft for engaging said latch 98 to elevate the same and release said drawer when the crank-handle is moved to effect registration, the locking-arm 102 for engaging said latch 98 and holding the same free of the cash-drawer during a portion of the movement of said crank-handle, the spring 106 connecting said latch 98 and arm 102, and means connected with said driving-shaft for releasing said arm 102 from said latch 97 upon the arriving of said crank-handle at its normal initial position; substantially as set forth.

Signed at New York city, county and State of New York, this 4th day of April, 1901.

ELMER S. SMITH.
HARVEY GILES.

Witnesses:
CHAS. C. GILL,
ANNA V. BRODERICK.